United States Patent
Gannatal

[11] Patent Number: 5,251,848
[45] Date of Patent: Oct. 12, 1993

[54] SPACE SHUTTLE WHEEL ACCELERATION SYSTEM

[75] Inventor: Joseph P. Gannatal, Camarillo, Calif.

[73] Assignee: The United States of America as represented by the Secretary of the Navy, Washington, D.C.

[21] Appl. No.: 882,720

[22] Filed: May 14, 1992

[51] Int. Cl.5 .................................... B64C 25/32
[52] U.S. Cl. ........................... 244/103 S; 244/103 R
[58] Field of Search ....................... 244/103 S, 103 R

[56] References Cited

U.S. PATENT DOCUMENTS

| | | | |
|---|---|---|---|
| 2,305,237 | 12/1942 | Carpenter | 244/103 S |
| 2,377,638 | 6/1945 | Lueck | 244/103 S |
| 2,403,309 | 7/1946 | Smith | 244/103 S |
| 2,404,018 | 7/1946 | Yaggy | 244/103 S |
| 2,412,033 | 12/1946 | Crosby | 244/103 S |
| 2,417,466 | 3/1947 | Brewer | 244/103 S |
| 2,435,801 | 2/1948 | Shively | 244/103 S |
| 2,941,758 | 6/1960 | Cordoba | 244/103 S |
| 3,233,849 | 2/1966 | Rabia | 244/103 S |
| 3,529,792 | 9/1970 | MacMahon | 244/103 S |
| 3,773,283 | 11/1973 | Abplanalp | 244/103 S |
| 3,797,786 | 3/1974 | House | 244/103 S |
| 3,814,354 | 6/1974 | Reese | 244/103 S |
| 3,866,860 | 2/1975 | Opite, Sr. | 244/103 S |
| 4,205,812 | 6/1980 | McSweeney | 244/103 S |
| 4,383,665 | 5/1983 | Maclean et al. | 244/103 S |

*Primary Examiner*—Joseph F. Peters, Jr.
*Assistant Examiner*—Christopher P. Ellis
*Attorney, Agent, or Firm*—Ron Billi; Melvin J. Sliwka

[57] ABSTRACT

A space shuttle wheel acceleration system includes a plurality of attachment bands located in the grooves of a tire and extending around the circumference of the tire with collapsible cups attached to the attachment bands located at spaced intervals around the tire that pop open on the downwind portion of a tire revolution to catch the wind and rotate the tire and collapse on the downwind portion of a revolution to reduce drag. The cups include elastic-bands to maintain the cup in a collapsed state when not catching the wind and also include stiffeners to prevent the cups from folding over when catching the wind. A breakaway buckle attaches the ends of each attachment band and automatically fails when the tire touches down to shed the space shuttle wheel acceleration system for smooth runway performance.

8 Claims, 3 Drawing Sheets

SPACE SHUTTLE WHEEL ACCELERATION SYSTEM

BACKGROUND OF INVENTION

This invention relates generally to aircraft tire pre-rotation devices. More specifically, but without limitation, the present invention relates to an expendable, flexible, strap-on wheel acceleration system for vehicles, such as the Space Shuttle, which is attached to the tire before launch and is automatically deployed to rotate the tire when the tire is lowered into the airstream prior to touchdown.

It is well known that aircraft tires are subjected to tremendous stresses, especially at the moment of touchdown when the wheel must be accelerated to a circumferential velocity equal to the landing speed. When the tire contacts the ground, a cloud of smoke attests to the frictional acceleration that occurs. To make matters worse, this frictional acceleration occurs simultaneously with the imposition of high tire compressive forces due to the mass of the aircraft slamming to the runway surface. The tires slip and scuff, resulting in rapid, extreme heat buildup, rapid and uneven tire wear and some loss of directional stability. The problem becomes more acute with vehicles such as the Space Shuttle due to the high approach velocity (250 mph). In addition, the need to minimize weight is critical since the Space Shuttle must be launched into space.

To solve the problem, various means have been employed to pre-rotate the tires before touchdown to minimize the velocity differential. U.S. Pat. Nos. 3,428,274 and 2,404,018 use active means remote from the tire, such as motors, to pre-rotate the tires via gear drives. U.S. Pat. Nos. 3,797,786, 4,383,665, 3,529,792 and 4,205,812 use passive means attached to the sides of the wheels or tires to catch the wind and pre-rotate the tires. Still others, such as U.S. Pat. Nos. 3,773,283, 2,417,466 and 2,403,309 utilize passive means incorporated into the tire tread or tire rain grooves to catch the wind and pre-rotate the tires.

However, these devices are either heavy and cumbersome or do not provide sufficient rotational torque to attain a high enough rotational velocity. In addition, systems employing elements located on the tire tread are inadequate as they produce high vibrations and loss of directional stability when large enough to pre-rotate the tires to adequate velocities. In addition, they contribute to rapid tire wear and heat build-up.

SUMMARY

Accordingly, the wheel acceleration device of the present invention includes a plurality of expendable, flexible cups located around the circumference of a tire (or wheel) for catching the air. The cups are fabricated and shaped in such a way that they automatically pop open to catch the air and create a rotating torque during the downward portion of a revolution and automatically fold substantially flat against the tire tread to minimize drag during the upwind portion of a revolution. The cups are held in position on the tire tread by a plurality of attachment bands positioned circumferentially in the tire rain grooves, each strap including a first end and a second end attached by a breakaway tensioning buckle.

Each cup has an upper section and lower section attached, for example, by stitching. The upper section of each cup includes 3 stiffeners, arranged approximately parallel to the tire tread for preventing the cup from folding over when catching the wind. Each upper section also includes a plurality of elastic bands, arranged approximately perpendicular to the tire tread, for retaining the upper section in a collapsed state when the tire is not deployed in the airstream. The lower section of each cup is positioned flat against the tire tread and is attached to the attachment bands. When the tire is deployed by lowering the landing gear into the airstream, the cups catch the wind and are popped open and driven by the airstream during the downwind portion of a revolution. On the upwind portion of the revolution, the cups are collapsed against the tire tread surface by a combination of the force of the airstream and the elastic bands. When the tire "touches down" the breakaway buckle fails, allowing the entire wheel acceleration system to be torn away from the tire.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 5 is a cross sectional view of a cup of the present invention showing the cup in the collapsed state.

DETAILED DESCRIPTION OF THE PREFERRED EMBODIMENT

Figure 1:
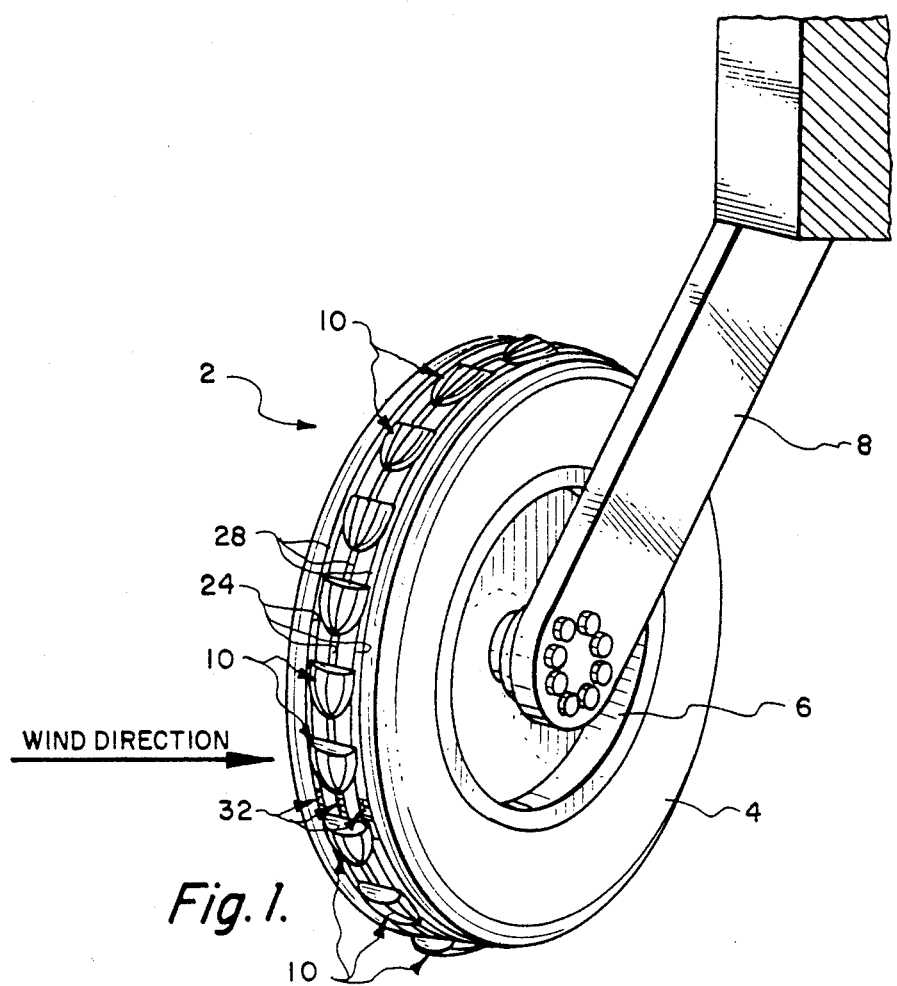
FIG. 1 is a perspective view of the wheel acceleration system of the present invention.

The preferred embodiment of the present invention is illustrated by way of example in FIGS. 1 to 6. As shown in FIG. 1, the wheel acceleration apparatus (WAA) 2 of the present invention is shown attached to aircraft tire 4 which in turn is attached to wheel 6 and landing gear 8. WAA 2 includes a plurality of cups 10 located adjacent the tread of tire 4 and positioned at spaced intervals around the circumference of tire 4.

Figure 3:
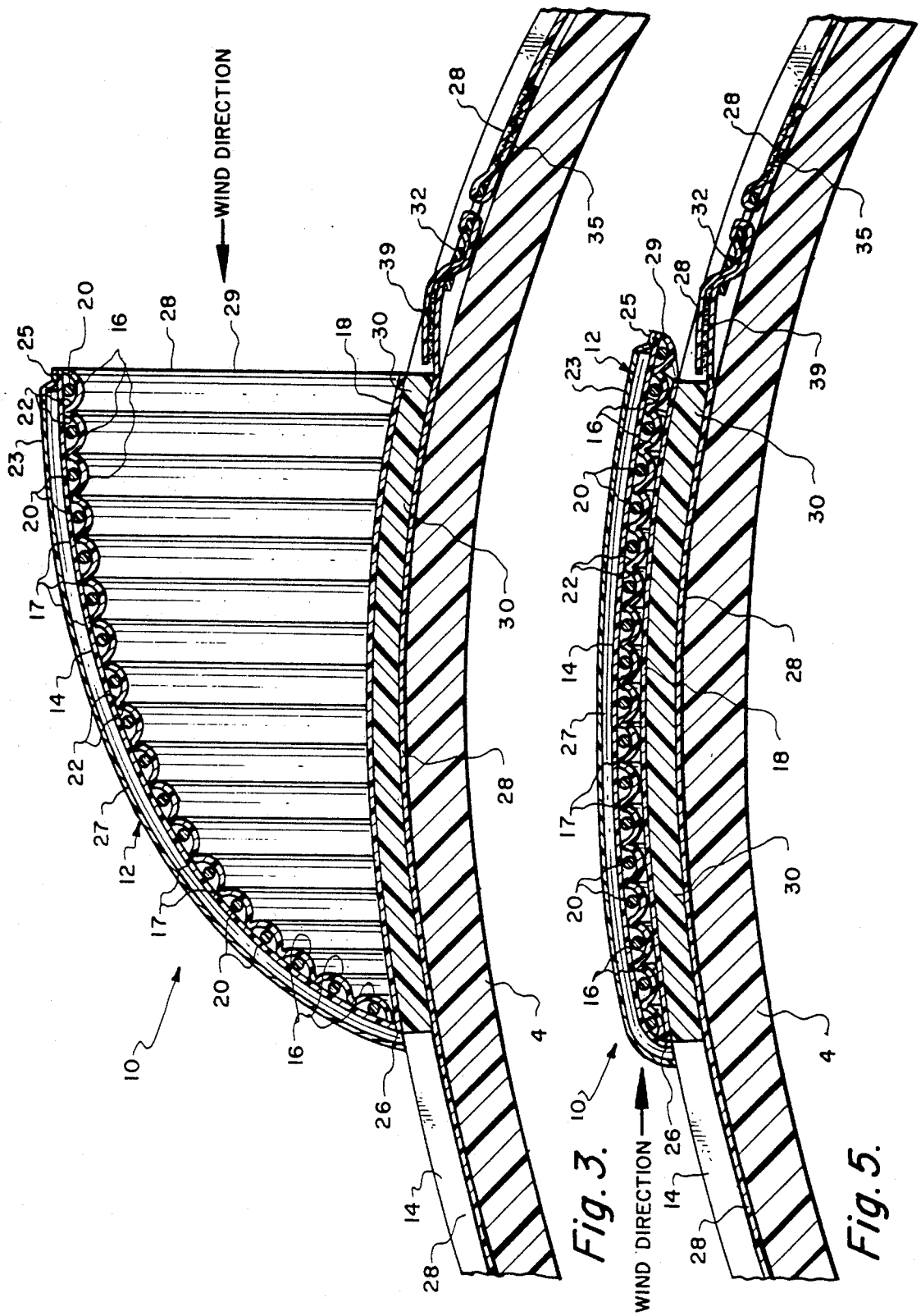
FIG. 3 is a cross sectional view of a cup of the present invention taken through lines 3—3 of FIG. 4.
Figure 4:
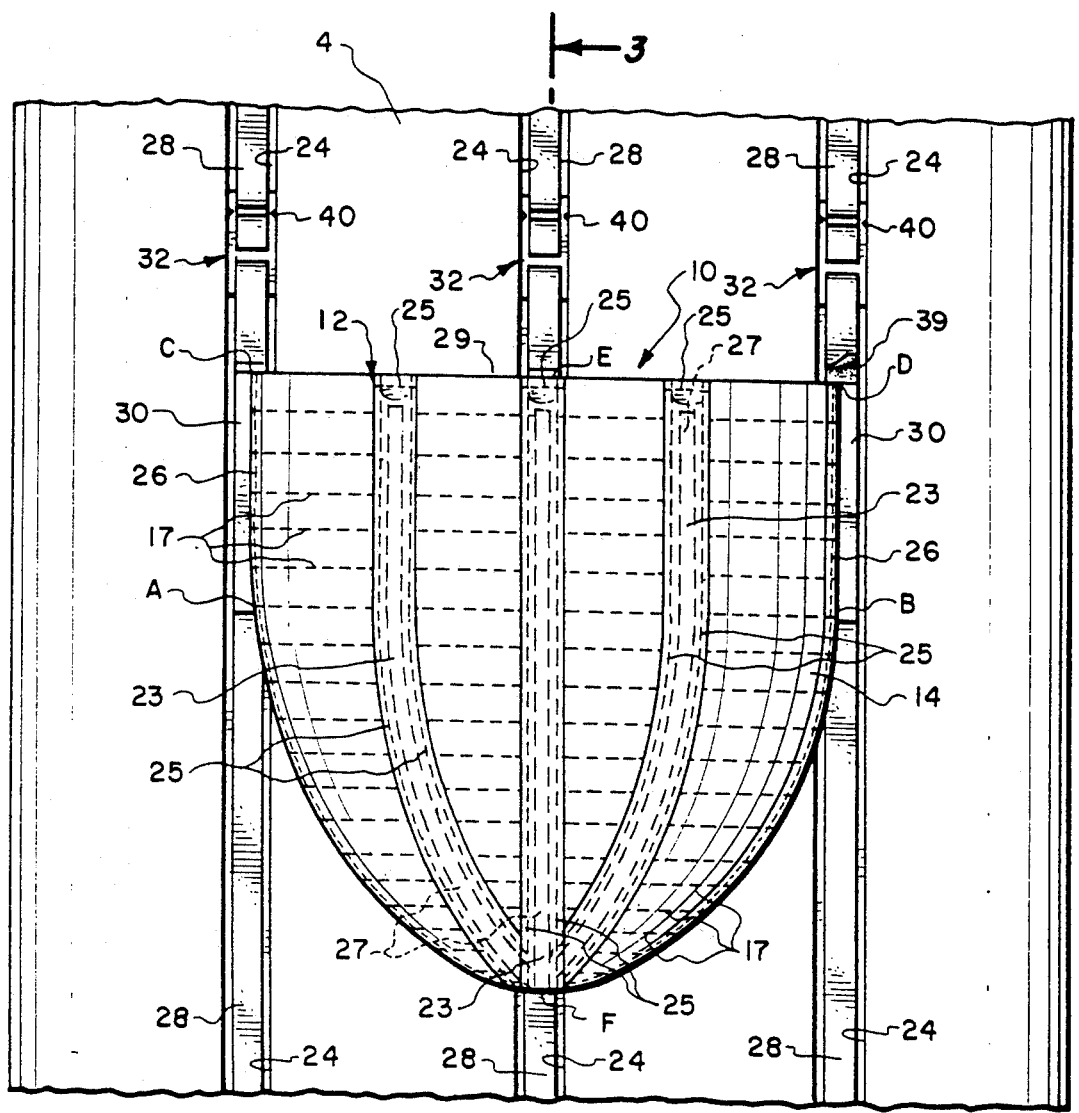
FIG. 4. is an illustration of the present invention showing the top of one cup mounted on a tire tread.

Referring to FIG. 3, each cup 10 includes a first upper part 12 with outer layer 14 and inner layer 16 and a second lower part 18. In the preferred embodiment, outer layer 14, inner layer 16 and lower part 18 are fabricated from cargo grade parachute silk or the like. Elastic bands 20 are located in pockets 22 formed by attaching layers 14 and 16 together at spaced intervals by stitching 17. As can be seen in FIG. 4, pockets 22, and the elastic-bands 20 that run inside the pockets, are substantially perpendicular to the circumferential rain grooves 24 of tire 4. Elastic bands 20 are fabricated from silicon rubber.

When WAA 2 is installed on tire 4 and not deployed in the airstream, the elastic bands 20 retain upper part 12 in a collapsed state substantially flat against tire 4 as shown in FIG. 5.

Figure 2:
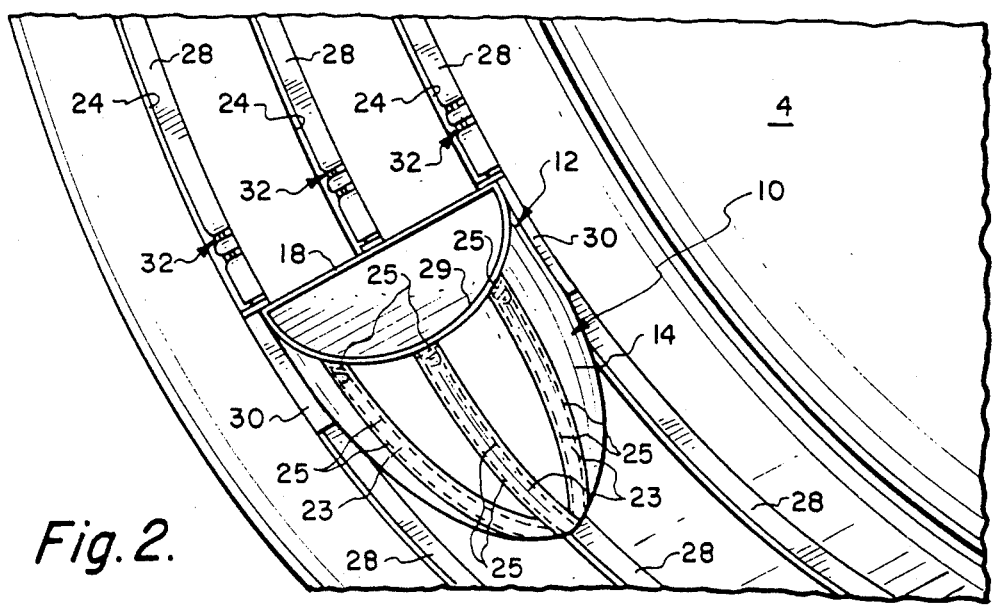
FIG. 2 is an illustration showing one cup of the present invention in the popped open position and also showing the attachment straps and the breakaway tensioning buckles.

When an aircraft has lowered its landing gear 8 and tire 4 is exposed to the airstream, cups 10 are popped open to the position shown in FIGS. 2, 3 and 4 and elastic bands 20 are stretched to accommodate this open position. The force of the airstream acting on open cups 10 thus creates a torque causing tire 4 (and wheel 6) to rotate in the forward direction to minimize the differential between landing velocity and circumferential tire velocity. Cups 10 remain open during the downwind rotation and close, that is, collapse, as shown in FIG. 5, during the upwind rotation. Both the elastic bands 20 and the wind force act to cause upper part 12 to collapse during the upwind rotation.

Upper part 12 is attached to lower part 18 by, for example, stitching 26. Stitching 26, and the shape of cup 10 as viewed in FIG. 4, has a substantially parabolic shape between points A and B with segment AC parallel to segment BD. Lower part 18 is attached, for example by stitching to attachment bands 28 with filler 30 there between. Since attachment bands 28 are located in the tire rain groove somewhat below the face of tire 4, filler 30 is sufficiently thick so that lower part 18 sits flat on tire 4. In this way, the flow through of air between lower portion 18 and tire 4 is minimized. Filler 30 is fabricated from nylon webbing.

Stiffeners 27 are located between outer layer 14 and cover 23 and extend from point F to edge 29 of upper part 12 as shown in FIG. 4. Covers 23 are attached to outer layer 14 by stitching 25. The stiffeners prevent upper part 12 from folding over when cup 10 is popped open. In the preferred embodiment stiffeners 27 are fabricated from nylon.

Figure 6:
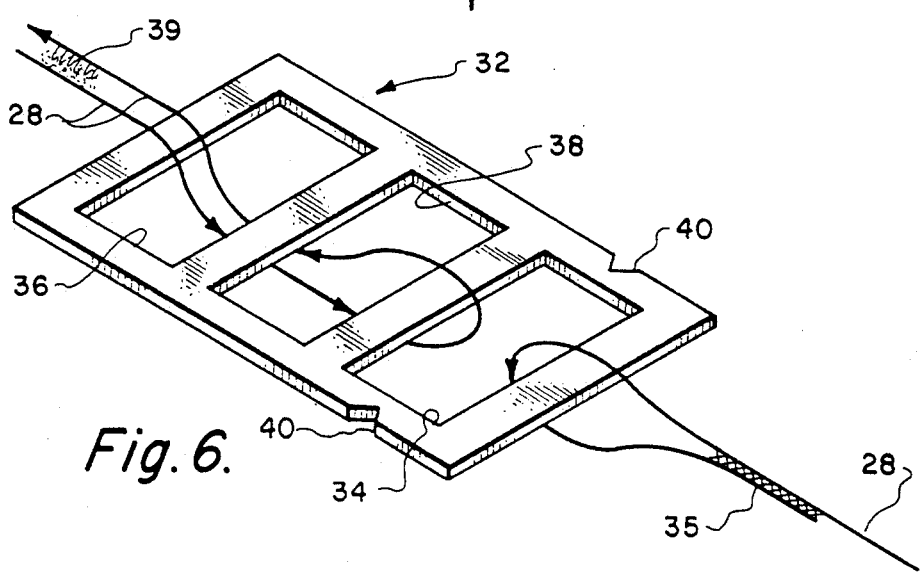
FIG. 6 is a perspective view of the breakaway tensioning buckle showing the attachment strap routing and the breakaway notches.

In the preferred embodiment, 3 attachment bands are provided, one in each rain groove. However, the number of attachment bands may vary depending on the application. The attachment bands on either side of cup 10 are attached to lower part 18 between points AC and BD respectively. The center attachment band 28 is attached to lower part 18 between points E and F. In the preferred embodiment, attachment band 28 is fabricated from nylon webbing or rect x-sect rope. Each attachment band 28 includes first and second ends attached by breakaway buckle 32. As shown in FIG. 6, breakaway buckle 32 includes 3 openings. One end of attachment band 28 is looped through opening 34, folded back on itself and attached by stitching 35 to form a permanent attachment. The other end of attachment band 28 is looped first through opening 36, then through opening 34, then through opening 38 and finally through opening 36 as shown in FIG. 6. The loose end of the attachment band 28 is attached to the load carrying portion of attachment band 28 by for example, hook-and-loop type fasteners 39 well known in the art and commonly known by the tradename Velcro or the like. In the preferred embodiment, breakaway buckle 32 is fabricated from high impact plastic such as ABS or fiberglass.

Breakaway notches 40 are located on both sides of buckle 32 adjacent opening 34. When tire 4 touches the runway surface, notches 40 are caused to fail, thereby allowing WAA 2 to be dislodged and torn away from tire 4.

Obviously many modifications and variations of the present invention are possible in light of the above teaching. It is therefore to be understood that within the scope of the appended claims, the invention may be practiced otherwise than as specifically described.

What is claimed is:

1. An expendable, flexible, strap-on tire prerotation apparatus for catching the wind and accelerating a tire of an aircraft prior to touchdown wherein the tire includes circumferential grooves comprising:
   a) attachment bands located in the circumferential grooves of said tire and extending around the circumference of said tire, each band having a first end and a second end;
   b) means for catching the wind, the wind catching means attached to the attachment bands;
   c) attachment means for attaching the first end of each said attachment band to the second end of each said attachment band, wherein said attachment means includes a breakaway buckle to allow the attachment bands to separate from said tire upon touchdown of said aircraft.

2. The apparatus defined in claim 1, wherein the wind catching means includes a plurality of collapsible cups located at spaced intervals around the circumference of said tire.

3. The apparatus defined in claim 2, wherein each cup includes an upper part and a lower part, the upper part opening on the downwind part of a tire revolution to catch the wind and rotate the tire and collapsing on the upwind portion of a tire revolution to reduce wind drag.

4. The apparatus defined in claim 3, wherein said upper part includes an outer layer and inner layer attached at intervals to form pockets therebetween, the pockets extending approximately perpendicular to the circumferential grooves of said tire and further including elastic bands located in said pockets between said outer layer and said inner layer for maintaining said upper part of said cup in a collapsed state when said cup is not open.

5. The apparatus defined in claim 4, further including means for stiffening said upper part to prevent said upper part from folding over when said upper part is catching the wind.

6. The apparatus defined in claim 5, wherein the stiffening means includes at least one cover and at least one stiffener, the cover attached to said outer layer and the stiffener located between said cover and said outer layer.

7. The apparatus defined in claim 6, wherein the breakaway buckle includes a first and second end, the first end of the breakaway buckle attached to the first end of said attachment band and the second end of said breakaway buckle attached to the second end of said attachment band.

8. The apparatus defined in claim 7, wherein said breakaway buckle includes notches intermediate said breakaway buckle ends wherein said breakaway buckle fails at said notches when said tire touches down.

* * * * *